United States Patent
Nakata

(10) Patent No.: US 6,727,950 B1
(45) Date of Patent: Apr. 27, 2004

(54) FOCUSING DEVICE FOR DIGITAL CAMERA INCLUDING CONTRAST CALCULATOR

(75) Inventor: Masahiro Nakata, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/387,495

(22) Filed: Sep. 1, 1999

(30) Foreign Application Priority Data

Sep. 3, 1998 (JP) .......................................... 10-249981

(51) Int. Cl.[7] .......................... H04N 5/232; H04N 5/225; G03B 13/00; G02B 13/16
(52) U.S. Cl. ...................... 348/353; 348/349; 348/345; 348/335
(58) Field of Search ................................. 348/349, 345, 348/335, 353

(56) References Cited

U.S. PATENT DOCUMENTS 5,664,239 A * 9/1997 Nakata ....................... 396/104
6,115,553 A * 9/2000 Iwamoto ..................... 396/104

FOREIGN PATENT DOCUMENTS

JP 10-90593 4/1998

OTHER PUBLICATIONS

English translation of JP 10–090593 Nakada et al Published Apr. 10, 1998.*

* cited by examiner

Primary Examiner—Wendy R. Garber
Assistant Examiner—James Hannett
(74) Attorney, Agent, or Firm—Greenblum & Bernstein, P.L.C.

(57) ABSTRACT

A focusing device is provided with an image sensor having a plurality of light receiving elements which output analog video signals, respectively. The analog video signal output by the image sensor is converted into an 8-bit data and contrast is calculated based on the 8-bit data. If thus calculated contrast is lower than a predetermined reference contrast, then the analog video signal is converted into a 9-bit data, and the contrast is calculated again.

9 Claims, 9 Drawing Sheets

FOCUSING DEVICE FOR DIGITAL CAMERA INCLUDING CONTRAST CALCULATOR

BACKGROUND OF THE INVENTION

The present invention relates to a focusing device for detecting a focusing condition of an object image using a CCD line sensor.

Conventionally, a focusing device using a CCD line sensor has been known. In the conventional focusing device, an analog image signal, which represents received light amounts for respective pixels, output by the line sensor is converted into a digital image signal having signal values representing received light amount of the respective pixels, a contrast is obtained by calculating the sum of differences of the signal values between adjoining pixels, and determines the focusing condition based on thus obtained contrast.

In the conventional focusing device, however, if the contrast of an object is relatively low, the focusing condition cannot be detected at a high reliability. Therefore, in the conventional focusing device, if the contrast is low, the output of the line sensor is amplified, or an integration period of the line sensor is increased, and then the output signals are shifted (i.e., a predetermined value is subtracted therefrom) using an operational amplifier.

Such configurations result in a complicated circuitry constitution of the focusing device.

SUMMARY OF THE INVENTION

It is therefore an object of the invention to provide an improved focusing device which is capable of detecting the focusing condition at a high precision with a simple circuitry structure.

For the above object, according to the present invention, there is provided a focusing device, which is provided with:
- an image sensor having a plurality of light receiving elements which receive an image of an object and output analog video signals, respectively;
- an analog-to-digital converter which converts the analog video signal output by the image sensor into first digital data having a first precision;
- a data converting system that is capable converting the first digital data into either of second digital data and third digital data, the second digital data having a second precision which is lower than the first precision, the third digital data having a third precision which is lower than the second precision;
- a contrast calculation system that calculates contrast based on data converted by the data converting system to obtain contrast of the object; and
- a judging system that judges whether the contrast obtained by the contrast calculation system is smaller than a predetermined reference value,
- wherein if the judging system judges that the contrast obtained based on the third digital data is smaller than the reference value, the contrast calculation system calculates the contrast based on the second digital data.

The contrast is firstly obtained based on lower precision data. Then, if the obtained contrast is lower than a reference value, the contrast is obtained again based on higher precision data. Therefore, focusing condition can always be detected precisely without making the circuitry constitution will no be complicated.

For example, the second precision is twice as precise as the third precision. In particular case, the first, second, third data may be 10-bit, 9-bit and 8-bit data, respectively.

Optionally, the second data is (n+1)-bit data, n being an integer, and the third data is n-bit data, n being an integer. Further, the data obtained by the subtraction system is n-bit data having substantially the same precision as the second data, and the contrast calculation system may calculate the contrast based on the data obtained by the subtraction system.

It is preferable that the focusing device further includes a subtraction system that subtracts a predetermined shift amount from the second data. In particular case, the second precision may correspond to a precision of 9-bit data and the third precision may correspond to a precision of 8-bit data, and the subtraction system may convert the second data to an 8-bit data by subtracting the shift amount from the data value of the second data. In this case, the shift amount may be a predetermined fixed value. Alternatively, the shift amount may be calculated based on maximum data value and minimum data value of the second data. In this case, the shift amount may be calculated as an averaged value of the maximum data value and the minimum data value.

BRIEF DESCRIPTION OF THE ACCOMPANYING DRAWINGS

DESCRIPTION OF THE EMBODIMENT

The present invention will be described with reference to the accompanying drawings.

Figure 1:
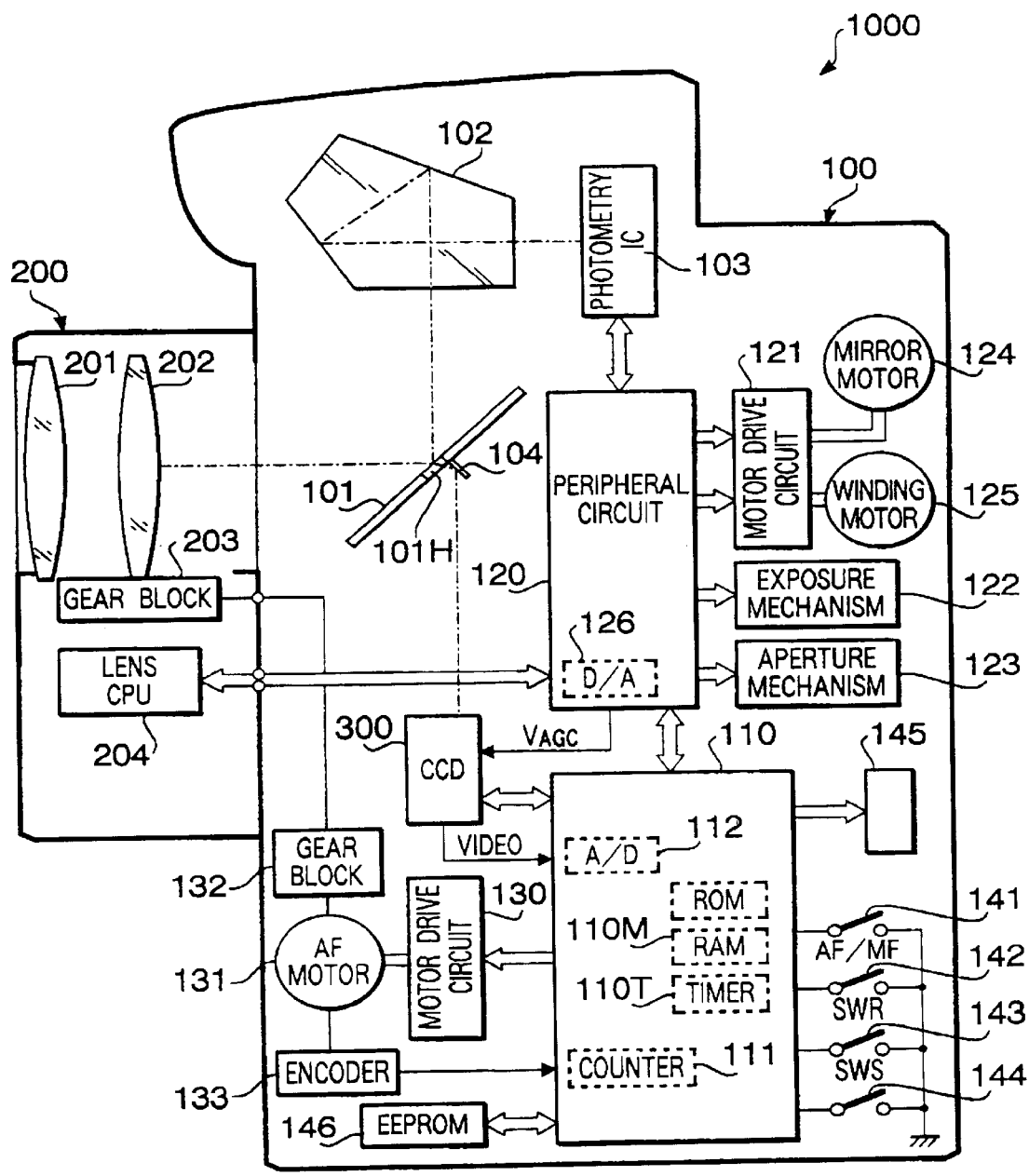
FIG. 1 is a block diagram showing an electrical structure of a camera employing a focusing device according to an embodiment of the present invention.

FIG. 1 is a block diagram of a control system of a camera 1000 employing a focusing device according to an embodiment of the invention.

The camera 1000 has a body 100 and an exchangeable photographing lens 200.

In the body 100, a quick return mirror 101 is provided. Above the quick return mirror 101, a penta prism 102 is provided. Light from an object passes through lens groups 201 and 202 included in the photographing lens 200, and is directed to an eyepiece lens (not shown) via the quick return mirror 101 and the penta prism 102. Part of the light incident on the quick return mirror 101 passes through a half mirror portion 101H, which is formed at a central area of the quick return mirror 101, is reflected by a sub-mirror 104 and is incident on a CCD line sensor 300. The CCD line sensor includes a plurality of light receiving elements (which will also be referred to as pixels, hereinafter) arranged in a line.

Circuits provided in the body 100 are controlled by a CPU (Central Processing Unit) 110. The CPU 110 is connected to a peripheral circuit 120, to which a photometry sensor 103, a motor driving circuit 121, an exposure mechanism 122, an aperture mechanism 123 are connected.

The motor driving circuit 121 drives a mirror motor 124 for moving the quick return mirror 101, and a winding motor 125 for winding a film.

The exposure mechanism 122 drives a shutter (not shown) and the aperture mechanism 123 adjusts the size of the aperture (not shown).

To the CPU 110, a motor driving circuit 130 for driving an AF motor 131. The AF motor 131 is connected with a gear block 132, which is connected with another gear block 203 provided inside the exchangeable lens 200, via a joint (not shown).

The lens groups 201 and 202 are focusing lens groups, which are movable, for focusing, in a direction of the optical axis thereof by the gear block 203. To an output shaft of the AF motor 131, an encoder 133 is connected. A pulse signal is output by the encoder 133 synchronously with rotation of the AF motor, and the pulse signal is transmitted to the CPU 110. A counter 111 provided in the CPU 110 counts the number of pulses of the pulse signal, and the CPU 110 determines the moving amount of the lens groups 201 and 202 based on the number of pulses.

The peripheral circuit 120 is provided with a D/A (Digital-to-Analog) converter 126. A voltage signal $V_{AGC}$ for determining output level of the CCD line sensor 300 is transmitted thereto via the D/A converter 126. An output video signal is transmitted to an A/D (Analog-to-Digital) converter 112 provided in the CPU 110. The pixel signal is used for driving the lens groups 201 and 202 to adjust the focusing condition.

To the CPU 110, an AF/MF selection switch 141, a release switch 142, a photometry switch 143 and a main switch 144 are connected. The AF/MF selection switch 141 is for selecting an AF mode where focusing is executed automatically or an MF mode where focusing is executed manually. The release switch 142 is turned ON when a shutter button (not shown) is fully depressed, while the photometry switch 143 is turned ON when the shutter button is half-depressed. When the AF mode is selected, and when the shutter button is half-depressed, the AF (Automatic Focusing) operation is executed. The main switch 144 is used to power ON/OFF the camera.

Further, a display device 145 and a non-volatile memory (e.g., EEPROM) 146 are connected to the CPU 110. The display device 145 displays the currently selected photographing mode, a shutter speed, an aperture value and the like. The EEPROM 146 stores data to be used for driving the focusing lens (i.e., the lens groups 201 and 202) to obtain the in-focus condition.

In the exchangeable photographing lens 200, a lens CPU 204 is provided. The lens CPU 204 communicates with the CPU 110 and transmits data intrinsic to the lens 200 for automatic focusing.

Figure 2:
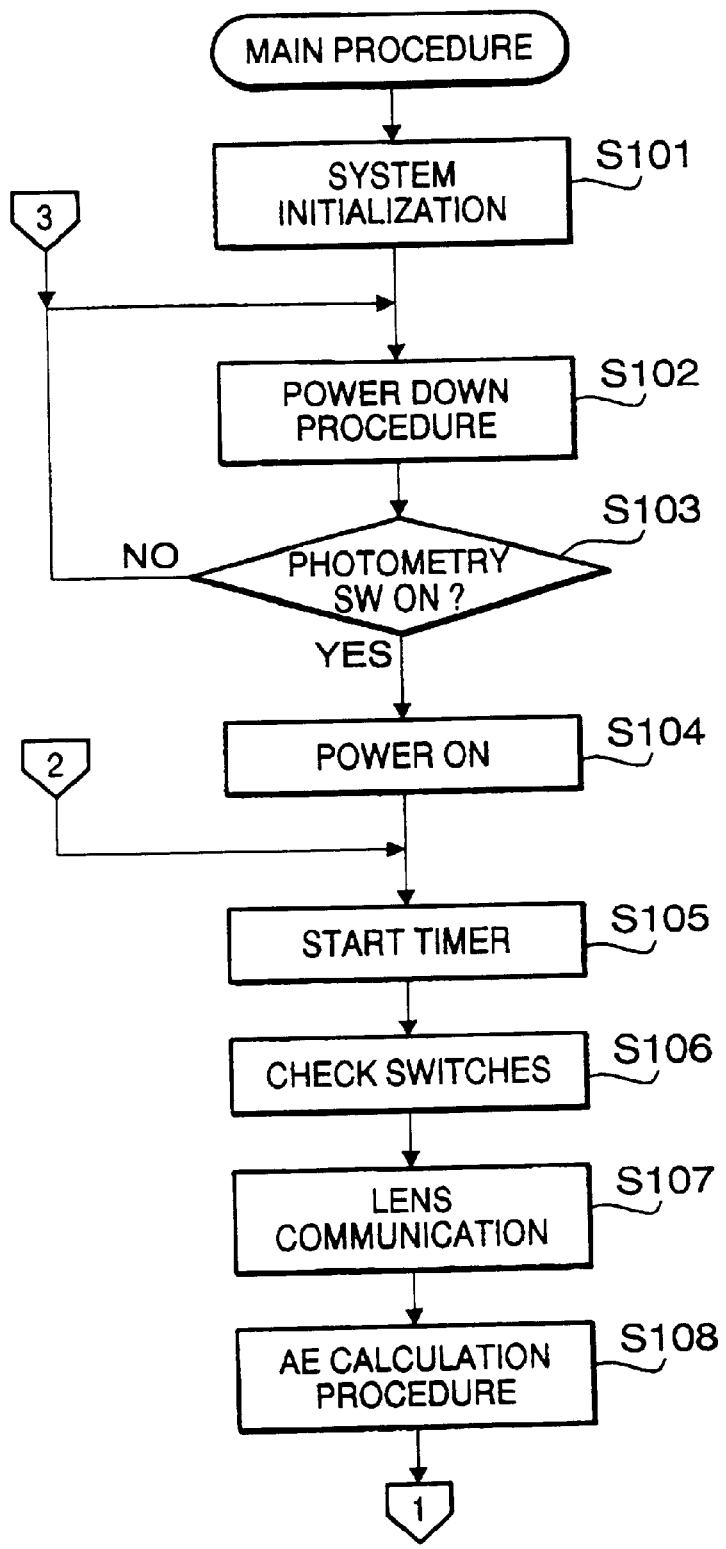
FIGS. 2 and 3 show a flowchart illustrating a main procedure of the camera shown in FIG. 1.
Figure 3:
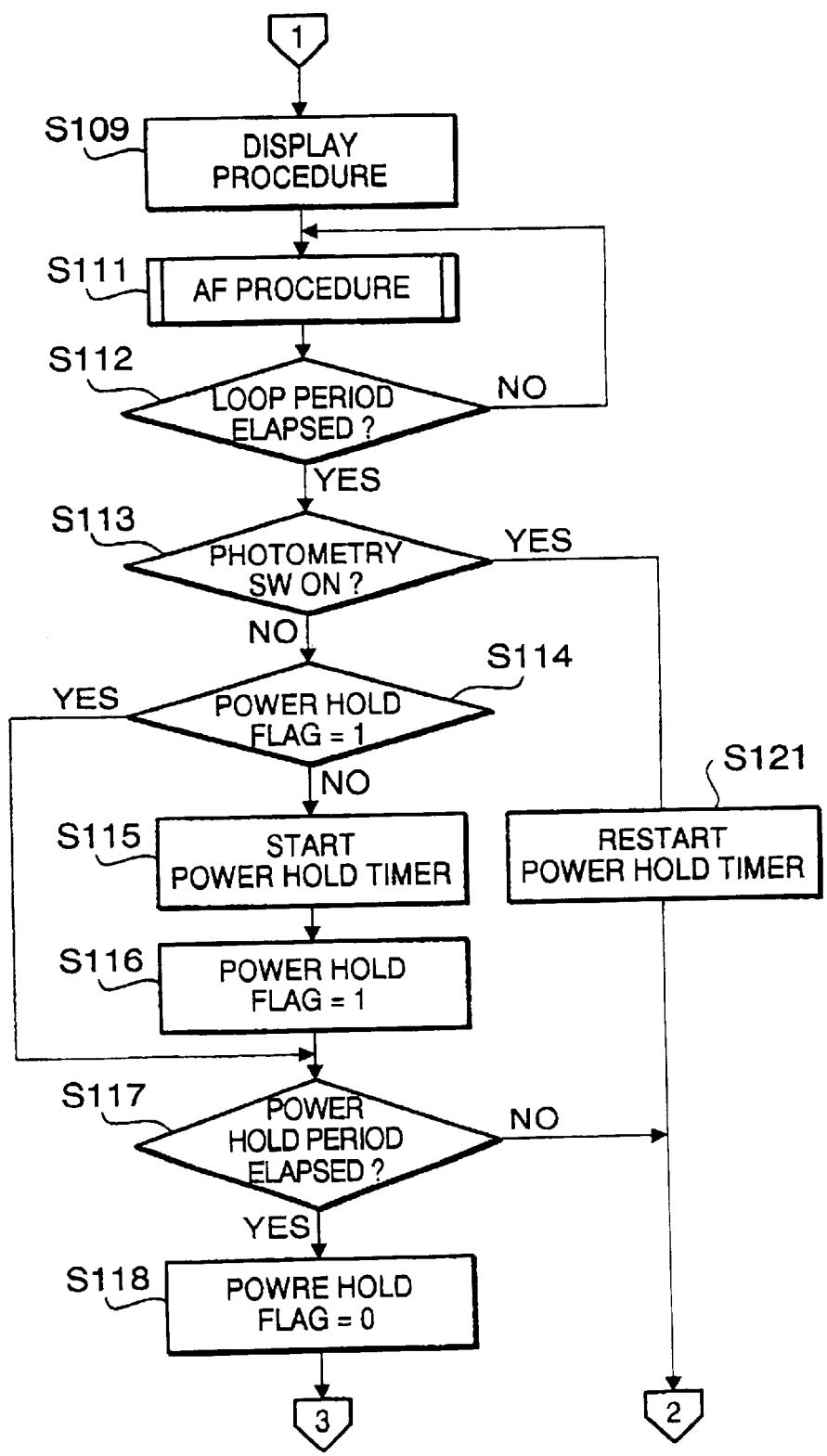

FIGS. 2 and 3 show a flowchart illustrating a main procedure for controlling the entire operation of the camera 1000. The main procedure initiates when a battery is inserted in the camera 1000.

In S101, initialization of the control system is executed. During initialization, various parameters are set to default values, respectively. In S102, a power down procedure is executed and the camera 1000 operates in a low power consumption mode. The power down procedure is also executed when the main switch 144 is turned OFF, or the shutter button of the camera is not operated for a predetermined period.

In S103, it is judged whether the photometry switch 143 is turned ON. While the photometry switch 143 is turned OFF (S103: NO), control returns to S102. If the photometry switch 143 is turned ON (i.e., if the shutter button is half depressed) (S103: YES), control proceeds to S104 where a power ON procedure is executed, and power is supplied to the circuits in the camera 1000.

In S105, a timer (FIG. 1: 111T) is started. In S106, a switch check procedure is executed and ON/OFF status of switches such as the AF/MF selection switch 141 is detected. In S107, a lens communication procedure is executed, and between the lens control circuit 204 and the CPU 110, various data such as f-number of the lens is transmitted to the CPU 110. In S108, an AE (Automatic Exposure) calculation procedure is executed, and the aperture value and the shutter speed are determined. In S109, a display procedure is executed, and the aperture value and the shutter speed determined in the AE calculation procedure are displayed on the display device 145.

In S111, an AF procedure is executed. That is, in accordance with the procedure shown in FIG. 4, if the photometry switch 143 is ON, the lens groups 201 and 202 are driven and focusing is executed. In S112, it is judged whether a predetermined period has elapsed since the timer was started in S105. The predetermined period is defined as a loop period, and is, for example, 100 ms (milliseconds). If the loop period has not yet elapsed (S112: NO), steps S111 and S112 are repeated. If the loop period has elapsed (S112: YES), control proceeds to S113.

In S113, it is judged whether the photometry switch 143 is ON. If the photometry switch 143 is ON (S113: YES), a power hold time (which will be described later) is restarted (S212) and then control returns to S105. Accordingly, steps S106 through S112 are executed, and the focusing operation is repeatedly performed for approximately 100 msec.

If the photometry switch 143 is turned OFF (S113: NO), it is judged whether a power hold flag is set to one in S114. The power hold flag is zero unless the power hold flag is set to one in S116. If the power hold flag is zero (S114: NO), in S115, the power hold timer is started and a power hold period is started to be measured. Then, in S116, the power hold flag is set to one.

In S117, it is judged whether the power hold period has elapsed since the timer was started at S115. Until the power hold period has elapsed (S117: NO), control returns to S105, and the above-described procedure is executed. When the power hold period has elapsed (S117: YES), control proceeds to S118. Accordingly, during the power hold period, even if no switches are operated, the power ON condition is maintained. When the power hold period has elapsed (S117: YES), the power hold flag is set to zero in S118, and then, control proceeds to S102 where the power down procedure is executed.

Figure 4:
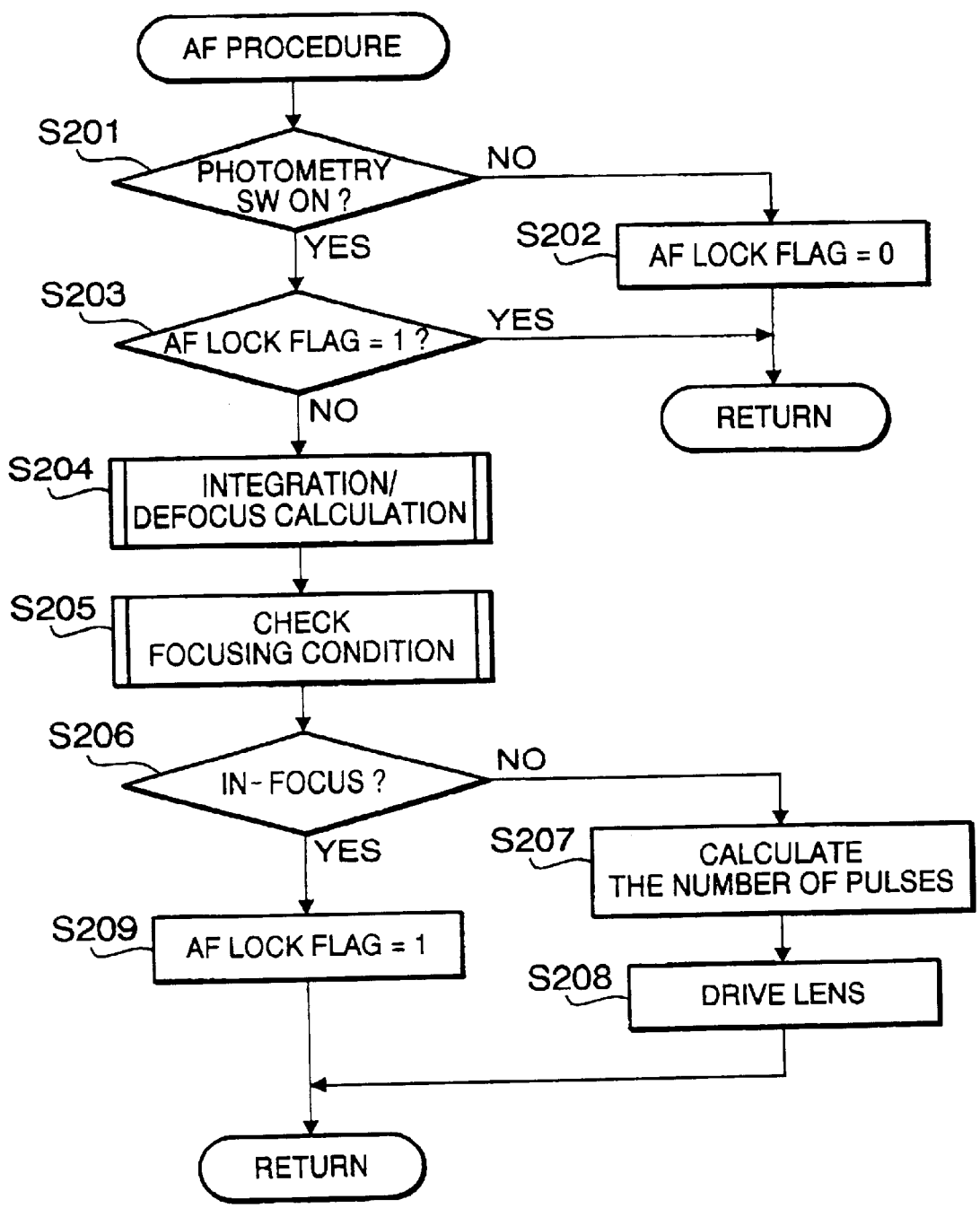
FIG. 4 is a flowchart illustrating an AF procedure.

FIG. 4 is a flowchart illustrating a sub-routine, the AF procedure, which is called in S111 of FIG. 3.

In S201, it is judged whether the photometry switch 143 is ON. If the photometry switch 143 is OFF (S201: NO), an AF lock flag is set to zero in S202, the AF procedure is terminated, and control returns to S112 of FIG. 3.

If the photometry switch 143 is ON (S201: YES), control proceeds to S203 where it is judged whether the AF lock flag is one. The AF lock flag is usually set to 0, and is set to one in S209 only when the in-focus condition is obtained. If the AF lock flag is zero (S203: NO), control proceeds to S204 where integration/defocus calculation procedures are executed, and to S205 where focusing check operation is executed.

When the lens groups 201 and 202 are driven and the in-focus condition is obtained (S206: YES), the AF lock flag is set to one in S209. Thereafter, as long as the photometry switch remains ON, only steps S201 and S203 are executed (S201: YES; S203: YES) when the AF procedure is executed. That is, the lens groups 201 and 202 are prohibited from moving (i.e., focus lock is applied). Since S111 of FIG. 3 is repeated during the loop period, the AF procedure shown in FIG. 4 is repeatedly executed. During the repetition of the procedure, if the photometry switch 143 is turned OFF (S201: NO), the AF lock flag is set to zero in S202, and accordingly, the focus lock is released (i.e., the lens groups 201 and 202 are allowed to move).

Figure 5:
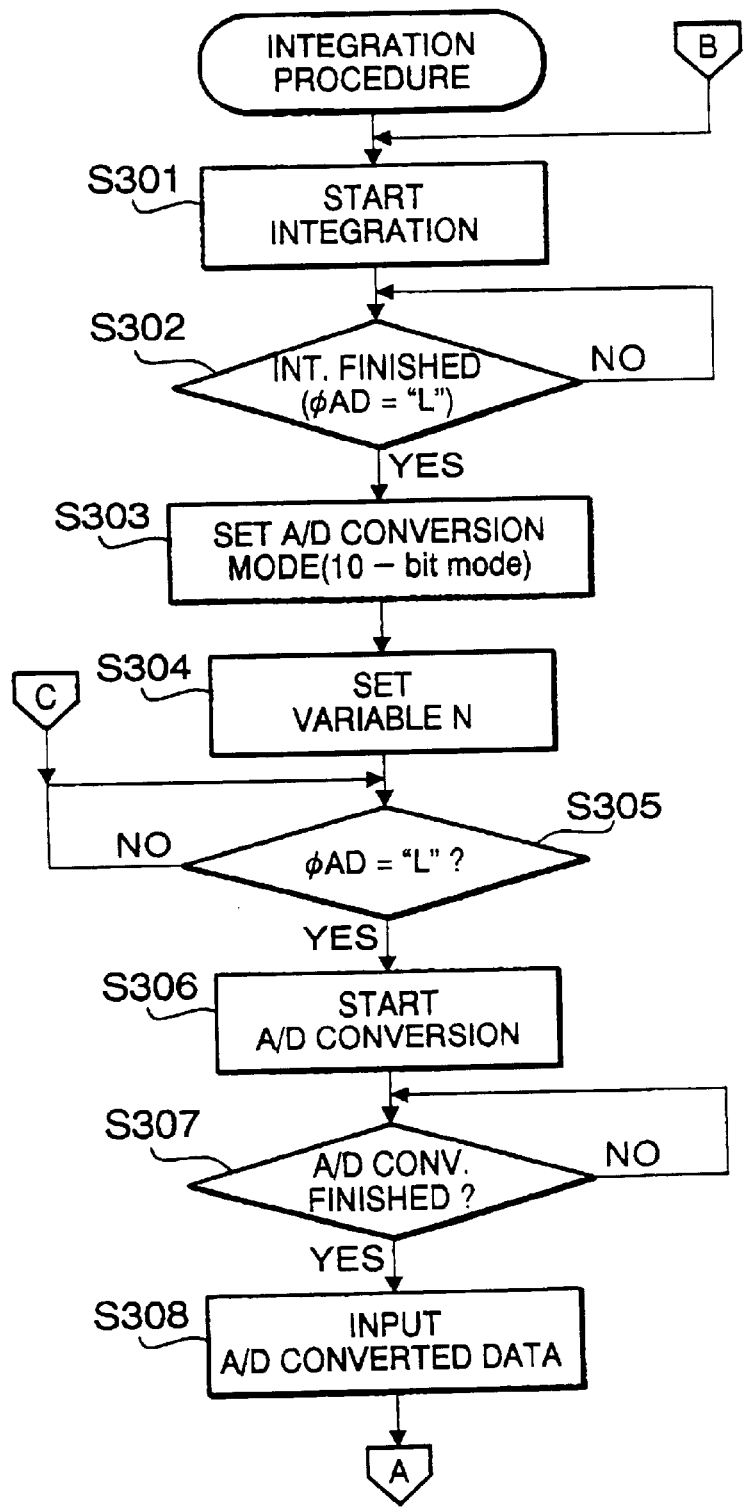
FIGS. 5 and 6 show a flowchart illustrating an integration procedure.
Figure 6:
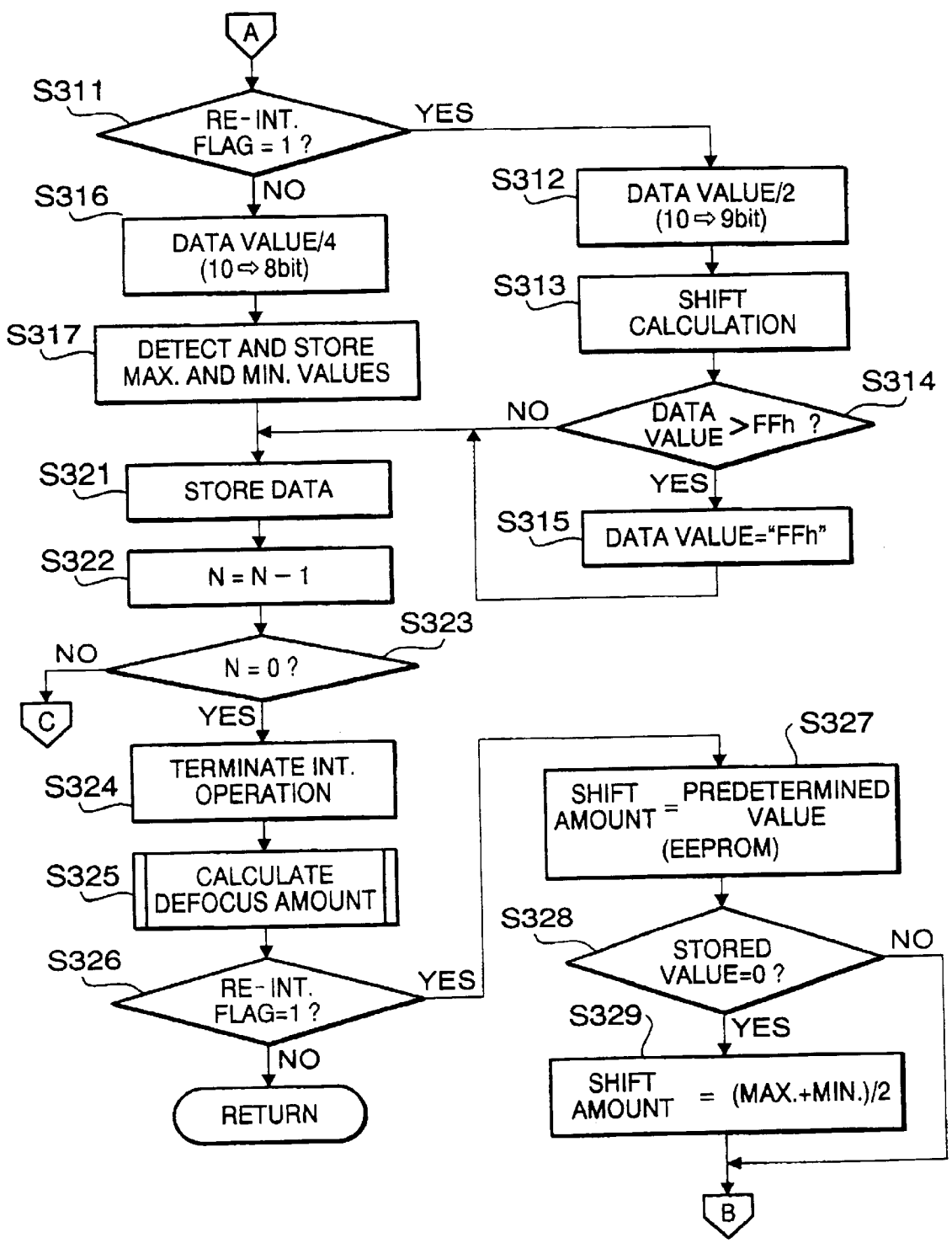

In S204, the integration procedure shown in FIG. 5 and the defocus calculation procedure shown in FIG. 6 are executed.

In the integration procedure, the CCD line sensor 300 is driven to integrate electrical charge corresponding to a line of an object image, and output an analog video signal for each pixel of a line of the object image. The analog video signal carries an analog signal value of each pixel of the received image. The analog video signal is converted into a digital video data representing digital signal values of the respective pixels. The digital video data is stored in a memory (i.e., a RAM) 110M of the CPU 110. In the defocus calculation procedure, a defocus amount is calculated based on the digital video data stored in the memory 110M of the CPU 110.

In S205 (FIG. 4), the focusing condition is examined. That is, in S205, the defocus amount obtained in S204 is read out of the memory and a focusing check procedure is executed. In S206, based on a difference between the defocus amount and a reference value, it is judged whether the in-focus condition is obtained. If the in-focus condition has not yet been obtained (S206: NO), the number of pulses to be applied to the motor drive circuit 130 is calculated in S207 based on the defocus amount. In S208, the motor 131 is driven in accordance with the number of pulses so that the lens groups 201 and 202 are driven to obtain the in-focus condition, and then, the AF procedure is terminated. If it is judged that the in-focus condition is obtained (S206: YES), then in S209, the AF lock flag is set to one, and the AF procedure is terminated.

FIGS. 5 and 6 show a flowchart illustrating the integration procedure which is executed in S204 of FIG. 4. FIGS. 7A–7D show a timing chart illustrating control of the focusing sensor 300. With reference to the above drawings, the integrating operation of the CCD will be described.

Figure 7:
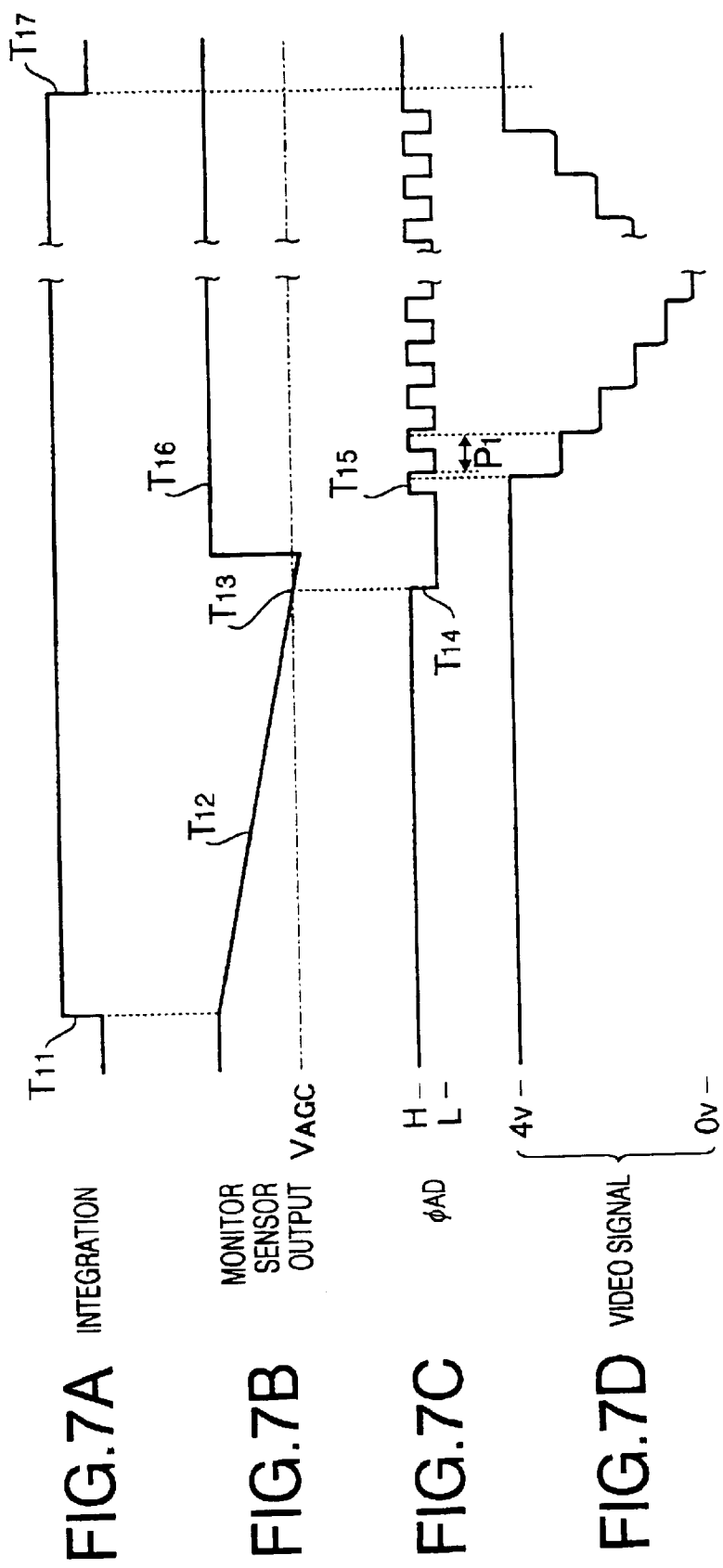
FIGS. 7A–7D show a timing chart showing control of the CCD line sensor.

In S301, integration is initiated (FIG. 7A: T11), and the electrical charge corresponding to the received image is accumulated in the CCD line sensor 300. As the accumulated electrical charge increases, the output level of the CCD line sensor 300 increases as time elapses (FIG. 7B: T12). It should be noted that, as shown in FIG. 7B, the output of the CCD line sensor 300 is an inverted output, which decreases as the electrical charge accumulated.

In S302, it is judged whether the integration is completed. When the output level of the CCD sensor reaches a predetermined level VAGC (at T13), a timing signal φAD is changed from "H" (high) to "L" (low) (FIG. 7C: T14). Therefore, when the timing signal φAD is changed to "L", it is judged at S302 that the integration has been finished, and control proceeds to S303.

The timing signal φAD is changed to "H" a predetermined period has passed after it was changed to "L" (FIG. 7C: T15), and then, it alternates between "H" and "L" at a predetermined interval. The output level of the CCD line sensor 300 returns to its initial value after it exceeds the predetermined level $V_{AGC}$ (FIG. 7B: T16).

In S303, a precision of the A/D converter 112 is set to a first precision. It should be noted that the precision is represented by the number of bits of binary data, and in this embodiment, the first precision corresponds to 10-bit data. In S304, a variable N is set to the number of pixels of the CCD line sensor 300.

In S305, it is judged whether the timing signal φAD is "L". If the timing signal φAD is "L", the analog image signal corresponding to one pixel is output to the A/D converter 112. In S305, if the timing signal φAD is judged to be "L", control proceeds to S306 where A/D conversion is executed. In S307, it is judged whether A/D conversion is finished. The period for alternation of "H" and "L" of the timing signal φAD is set to a period P1 necessary for applying the A/D conversion to the image signal for one pixel. Therefore, the timing signal φAD does not change before the A/D conversion is finished.

When the A/D conversion is finished, control proceeds from S307 to S308. In S308, the A/D converted value, i.e., the 10-bit data for each pixel is stored in the RAM 110M of the CPU 110. When the digital data is stored in the RAM 110M, a relationship between a smaller value and a greater value is reversed. The value of the analog video signal is 0V for the brightest image, and 4V for the darkest image, and by the A/D conversion, the obtained digital data values correspond to the values of the analog video signal. Therefore, by reversing the great-small relationship of the digital data values (e.g., with 10 bits, 0V is represented by 3FFh and 4V is represented by 0h), the stored image signal directly represents the brightness of the image.

In S311, it is judged whether a re-integration flag is one. The re-integration flag is set during the defocus calculation procedure shown in FIG. 8. The re-integration flag is set to zero (0) when the contrast obtained by the contrast calculation procedure is greater than or equal to a reference value, and set to one (1) when the contrast value is less than the reference value. When the re-integration flag is set to one (S311: YES), control proceeds to S312, where the digital data value is divided by two (i.e., the lowest bit of the 10-bit digital data is invalidated and the remaining bits are shifted right by 1 bit) so that the 10-bit digital data is converted into a 9-bit digital data. That is, the precision of the video data is changed from 10-bit precision to a lower precision (9-bit). In S313, a shift calculation is executed, and from the 9-bit video signal (digital data), the shift amount obtained in S327 (which will be described later) is subtracted and an 8-bit data is obtained. The video signal is converted in this way since the number of bits of the data to be stored in the RAM 110M of the CPU 110 is eight.

In S314, it is judged whether the eight-bit video signal value obtained in S313 is greater than the maximum value (FFh: "FF" in hexadecimal) of the 8-bit data. If the data value obtained in S313 is greater than the maximum value (S314: YES), the data value is set to (i.e., limited to) the maximum value (i.e., FFh) in S315. Thus, the data value of the image data never exceeds the maximum value FFh. If the data value obtained in S313 is less than or equal to the maximum value (S314: NO), the data value is not changed and control proceeds from S314 to S321.

If it is determined that the re-integration flag is zero in S311, control proceeds to S316, where the digital data value is divided by 4 and thus the 10-bit data is converted into the 8-bit data (i.e., the lowest two bits of the 10-bit digital data are invalidated and the remaining bits are shifted right by 2 bits). Accordingly, in this case, the video signal is converted into digital data having a third precision which is lower than the second precision. In S317, the maximum data value and the minimum data values of the 8-bit data which have been obtained are detected, and stored in the RAM 110M. Then, control proceeds to S321. It should be noted that when S317 is executed first time, the data value obtained in S316 is used as both the maximum and minimum values.

In S321, the digital video data obtained at S313, S315 or S317 is stored in the RAM 10M of the CPU 110. Then in S322, the variable N representing the number of pixels, from which the digital data will be received, is decremented by one. In S323, if the calculated number of the pixels has not yet reached zero (S323: NO), i.e., if the A/D conversion has not yet been applied to all the pixels output from the CCD sensor 300, control proceeds to S305.

Figure 8:
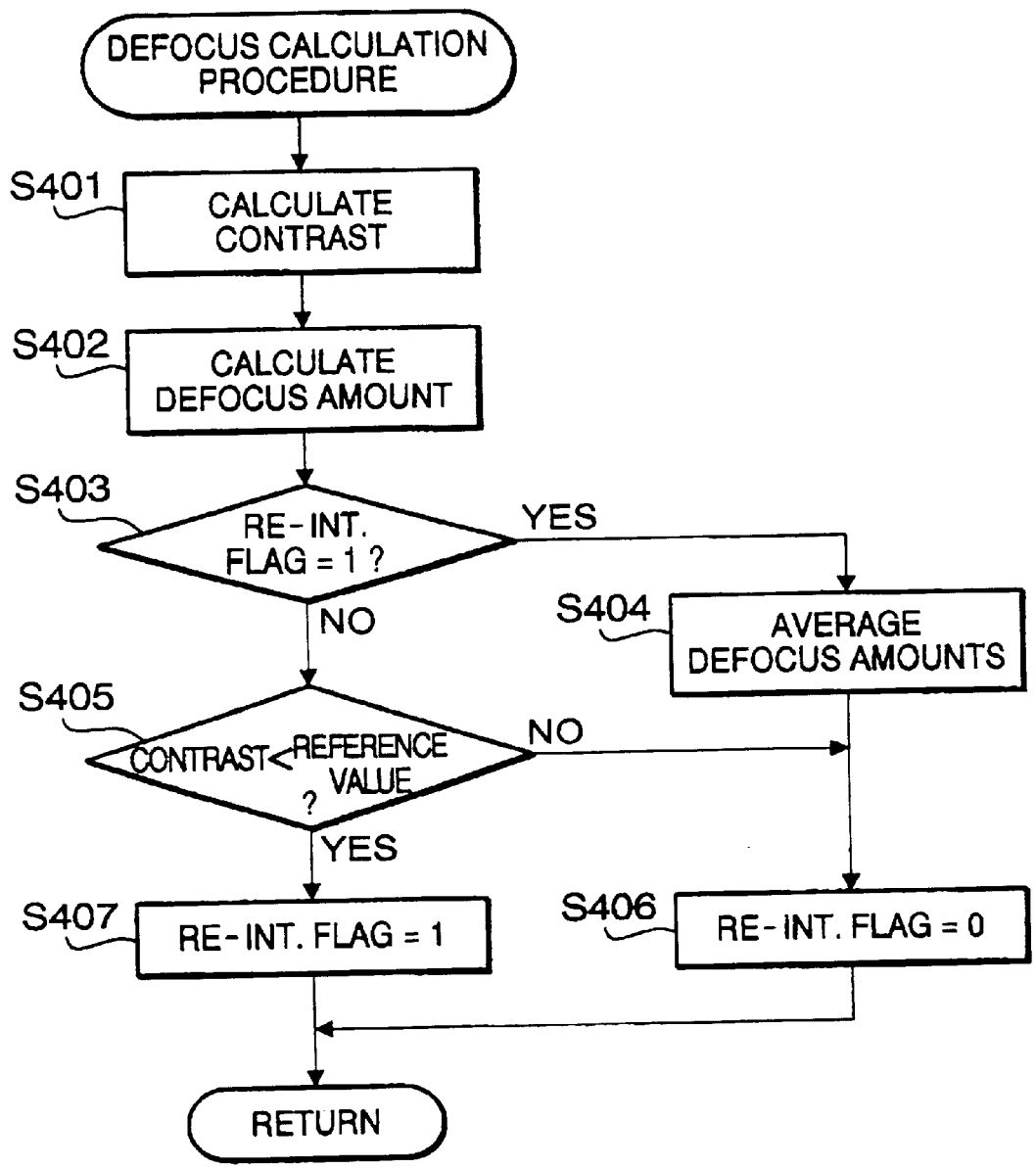
FIG. 8 is a flowchart illustrating a defocus calculating procedure.

In S323, if it is judged that the variable N is zero, control proceeds to S324, where integration completing procedure is executed, i.e., a command signal indicating termination of the integration operation from the CPU 110 to the CCD sensor 300 is generated. Then, the CCD sensor 300 stops accumulating electrical charges (FIG. 7A: T17). In S325, the defocus calculation procedure shown in FIG. 8 is executed and the defocus amount is obtained and the re-integration flag is set to zero or one.

In S326, it is judged whether the re-integration flag is one. If the re-integration flag is zero, the integration procedure is terminated. If the re-integration flag is set to one in S325, steps S327 through S329 are executed and the shift amount used in S313 is calculated.

In S327, the predetermined value stored in the EEPROM 146 is read out and set as the shift amount. It should be noted that the value is stored when there is an appropriate value intrinsic to a camera, and if there is not an appropriate value, zero is stored in the EEPROM 146.

If the predetermined value stored in the EEPROM 146 is not zero (S328: NO), the predetermined value is used as it is. If the stored value is zero, which means the predetermined value is not stored in the EEPROM 146. In such a case, step S329 is executed and the shift amount is calculated as an average of the maximum and minimum data values obtained in S317.

Figure 9:
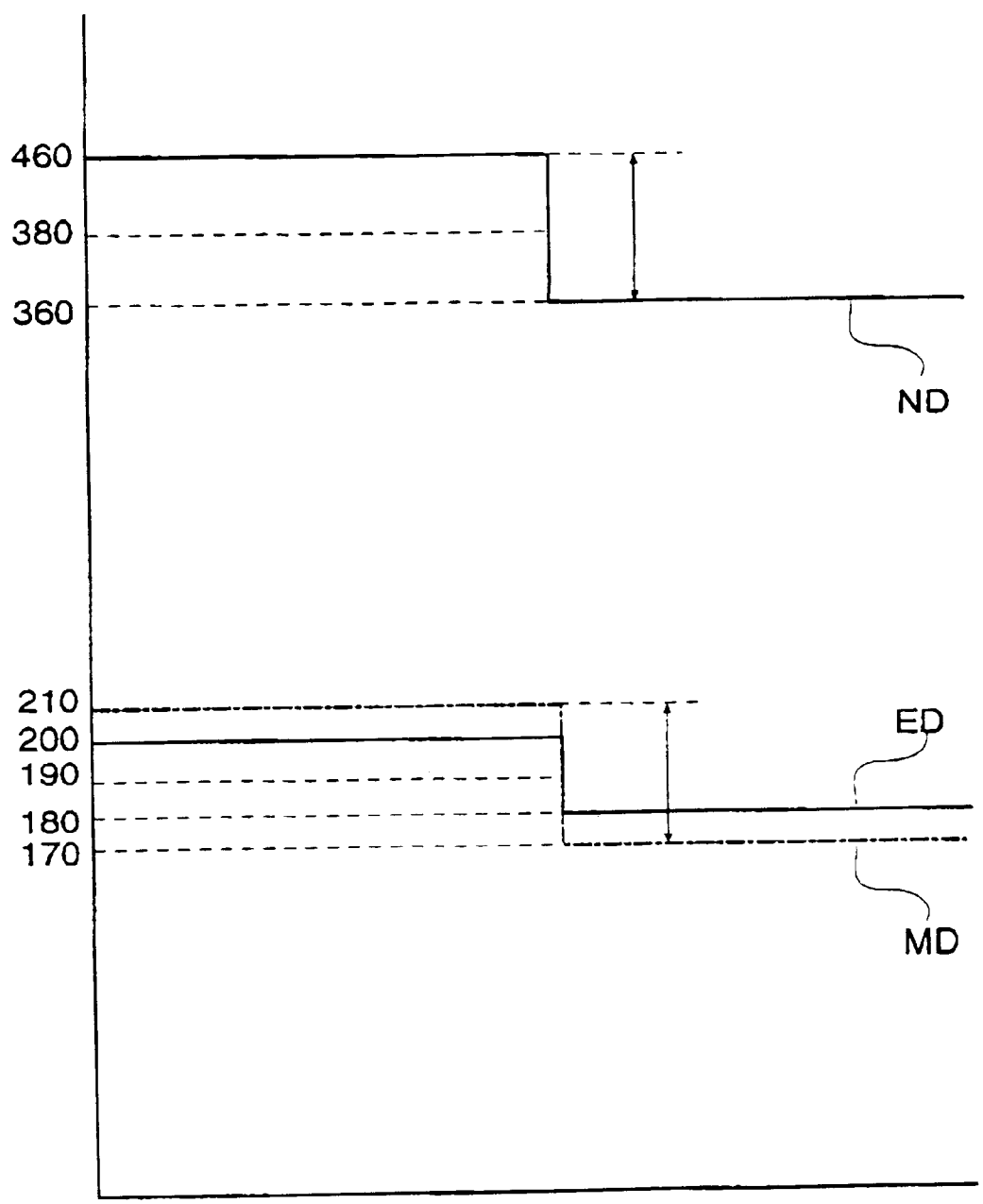
FIG. 9 is a graph illustrating calculation of shift amount.

FIG. 9 is a graph explaining the calculation of the shift amount using exemplary data values.

Line ND represents maximum and minimum 9-bit data values (indicated in decimal) and line ED represents maximum and minimum 8-bit data values corresponding to the 9-bit data values (indicated in decimal). Firstly, by averaging the maximum value (200) and the minimum value (180), the central value (190) between the maximum and minimum values is obtained. Then, the central value (190) is subtracted from the maximum value (400) and the minimum value (380) of the 9-bit data values, as the shift amount. With this calculation, data values represented by line MD are obtained. Line MD represents 8-bit data values: the central value of its maximum and minimum values is 190; the difference between the maximum and minimum values is the same as the difference between the maximum and minimum values of the 9-bit data values.

After the shift amount is determined, control proceeds to S301, and the integration operation of the CCD sensor 300 is executed.

As described above, in the integration procedure, steps S301–S308 are executed first, and the A/D conversion of the video signal output by the CCD sensor 300 is executed. The A/D conversion is executed at the precision of 10 bits. Initially, the re-integration flag is set to zero and therefore, control proceeds to S311 to S316, and the video signal is converted from 10-bit precision data to the eight-bit precision data. Control proceeds to S317, S321, S322 and S323 in this order, and returns to S305 where the A/D conversion is applied to the next pixel.

In the similar fashion, for all video signals output by the CCD sensor 300, the A/D conversion is executed. Then, control proceeds from S323 to S324 and S325, where the contrast calculation and defocus calculation are performed, and the re-integration flag is set to zero or one. If the re-integration flag is one, the shift amount is calculated in S327–S329. Then, integration operation of the CCD sensor 300 is executed again. Control then proceeds from S311 to S312, and the digital video signal is changed from 10-bit data to 9-bit data.

The shift amount is subtracted from 9-bit data value in S313 so that the data is converted into the 8-bit digital data. That is, the digital data is converted into the 8-bit signal with the 9-bit precision remained in a difference between each data value. In other words, the 8-bit digital data obtained at S313 is the data potentially including information of the lowest bit of the 9-bit digital data. For example, in a 9-bit pixel signal, if the data value for an N-th pixel is "244", the data value for the (N+1)-th pixel is "199", and the shift amount is "122", by subtraction, the data value for the N-th pixel is "122", the data value for the (N+1)-th pixel is "77". In this case, the difference between 9-bit data values, i.e., "244" and "199" (i.e., 46) remains the same even if the subtraction is executed (i.e., the difference between the converted 8-bit data values equals to 46.

FIG. 8 is a flowchart illustrating the defocus calculation procedure which is called at S325 of the flowchart shown in FIG. 6.

In S401, the contrast calculation is executed. Specifically, for a video signal output by the CCD sensor 300, the sum of absolute values of a differences between the signal values of the adjoining pixels (i.e., the contrast value) is calculated. In S402, the defocus calculation is executed. In the defocus calculation, a defocus amount is obtained based on a shift amount between two object images formed on the CCD sensor 300.

In S403, it is judged whether there-integration flag is one. Since the initial value of the re-integration flag is zero, when step S403 is executed first time, control proceeds to S405. In S405, it is judged whether the contrast value obtained in S401 is less than a reference value. The reference value was experimentally determined value at or near which the focusing condition may not be reliably detected. If the contrast value is smaller than the reference value, it is impossible to detect the focusing condition of the object image precisely. In this case, in order to increase the bit length of the digital video signal used in the defocus calculation, the re-integration flag is set to one, and the procedure is terminated. If the contrast value is greater than or equal to the reference value, the re-integration flag is set to zero in S406 and the procedure is terminated.

If it is judged that the re-integration flag is set to one (S403: YES), the defocus calculation procedure has been executed, and a 9-bit data has been obtained in the integration procedure. In this case, in S404, an average value of a previously obtained defocus amount and the currently obtained defocus amount is used as a valid defocus amount, and is stored in the RAM of the CPU 110. Then, in 5406, the procedure is terminated. The defocus amount is read out of the RAM in S205, and used for determining the moving amount of the lens groups 201 and 202.

As above, in the present invention, the contrast is obtained at 8-bit precision. Then, if the contrast is lower than the reference value, the contrast is obtained against 9-bit precision, i.e., twice as precise as the 8-bit precision. Therefore, focusing condition can always be detected precisely. Further, the circuitry constitution will not be complicated.

Furthermore, even if the contrast is calculated at the 9-bit precision, the data length of the pixel signal is converted to 8 bits in S313. Accordingly, the contrast calculation is relatively simple, and it is unnecessary to change the length of the data stored in the RAM of the camera.

The present disclosure relates to the subject matter contained in Japanese Patent Application No. HEI 10-249981, filed on Sep. 3, 1998, which is expressly incorporated herein by reference in its entirety.

What is claimed is:

1. A focusing device, comprising:
    an image sensor having a plurality of light receiving elements which receive an image of an object and output analog video signals, respectively;
    an analog-to-digital converter which converts the analog video signals output by the image sensor into first digital data having a first precision;
    a data converting system that is configured to be capable of converting the first digital data into either of second digital data and third digital data, said second digital data having a second precision which is lower than said first precision, said third digital data having a third precision which is lower than said second precision;
    a subtraction system that subtracts a predetermined shift amount from the second data;
    a contrast calculator that calculates contrast based on data converted by said data converting system to obtain contrast of said object; and
    a judging system that judges whether the contrast obtained by said contrast calculator is smaller than a predetermined reference value;
    wherein if said judging system judges that the contrast obtained based on the third digital data is smaller than said reference value, said contrast calculation system calculates the contrast based on the second digital data.

2. The focusing device according to claim 1, wherein said second precision is twice as precise as said third precision.

3. The focusing device according to claim 1, wherein said first, second, third data is 10-bit, 9-bit and 8-bit data, respectively.

4. The focusing device according to claim 1, wherein said second data is (n+1)-bit data and said third data is n-bit data, n being an integer, wherein data obtained by said subtraction system is n-bit data having substantially the same precision as said second data, and said contrast calculator calculates the contrast based on said data obtained by said subtraction system.

5. The focusing device according to claim 1, wherein said second precision corresponds to a precision of 9-bit data and said third precision corresponds to a precision of 8-bit data, and wherein said subtraction system converts said second data to an 8-bit data by subtracting the predetermined shift amount from the data value of said second data.

6. The focusing device according to claim 1, wherein said shift amount is a predetermined fixed value.

7. The focusing device according to claim 1, wherein said shift amount is calculated based on maximum data value and minimum data value of the second data.

8. The focusing device according to claim 7, wherein said shift amount is an averaged value of the maximum data value and the minimum data value.

9. The focusing device according to claim 1, wherein said shift amount is a calculated value.

* * * * *

UNITED STATES PATENT AND TRADEMARK OFFICE
CERTIFICATE OF CORRECTION

PATENT NO.    : 6,727,950 B1
DATED         : April 27, 2004
INVENTOR(S)   : Masahiro Nakata It is certified that error appears in the above-identified patent and that said Letters Patent is hereby corrected as shown below:

<u>Column 9, line 16 thru Column 10, line 36,</u>
Delete claims 1-9 and substitute therefor claims 1-9 on the attached pages:
    1. A focusing device, comprising:
    an image sensor having a plurality of light receiving elements which receive an image of an object and output analog video signals, respectively;
    an analog-to-digital converter which converts the analog video signals output by the image sensor into first digital data having a first precision;
    a data converting system that is configured to be capable of converting the first digital data into either of second digital data and third digital data, said second digital data having a second precision which is lower than said first precision, said third digital data having a third precision which is lower than said second precision;
    a subtraction system that subtracts a predetermined shift amount from the second data;
    a contrast calculator that calculates contrast based on data converted by said data converting system to obtain contrast of said object; and
    a judging system that judges whether the contrast obtained by said contrast calculator is smaller than a predetermined reference value;
    wherein if said judging system judges that the contrast obtained based on the third digital data is smaller than said reference value, said contrast calculator calculates the contrast based on the second digital data.
    2. The focusing device according to claim 1, wherein said second precision is twice as precise as said third precision.
    3. The focusing device according to claim 1, wherein said first, second, third data is 10-bit, 9-bit and 8-bit data, respectively.
    4. The focusing device according to claim 1, wherein said second data is (n+1)-bit data and said third data is n-bit data, n being an integer, wherein data obtained by said subtraction system is n-bit data having substantially the same precision as said second data, and said contrast calculator calculates the contrast based on said data obtained by said subtraction system.
    5. The focusing device according to claim 1, wherein said second precision corresponds to a precision of 9-bit data and said third precision corresponds to a precision of 8-bit data, and wherein said subtraction system converts said second data to an 8-bit data by subtracting the predetermined shift amount from the data value of said second data.
    6. The focusing device according to claim 1, wherein said shift amount is a predetermined fixed value.
    7. The focusing device according to claim 1, wherein said shift amount is calculated based on maximum data value and minimum data value of the second data.
    8. The focusing device according to claim 8, wherein said shift amount is an averaged value of the maximum data value and the minimum data value.

UNITED STATES PATENT AND TRADEMARK OFFICE
CERTIFICATE OF CORRECTION

PATENT NO. : 6,727,950 B1
DATED : April 27, 2004
INVENTOR(S) : Masahiro Nakata

It is certified that error appears in the above-identified patent and that said Letters Patent is hereby corrected as shown below:

<u>Column 9, line 16 thru Column 10, line 36, (cont)</u>
      9. The focusing device according to claim 1, wherein said shift amount is a calculated value.

Signed and Sealed this

First Day of March, 2005

JON W. DUDAS
*Director of the United States Patent and Trademark Office*